Nov. 6, 1934.    A. MILLER    1,980,074
CORN PLANTER ATTACHMENT
Filed Nov. 6, 1933    2 Sheets-Sheet 2
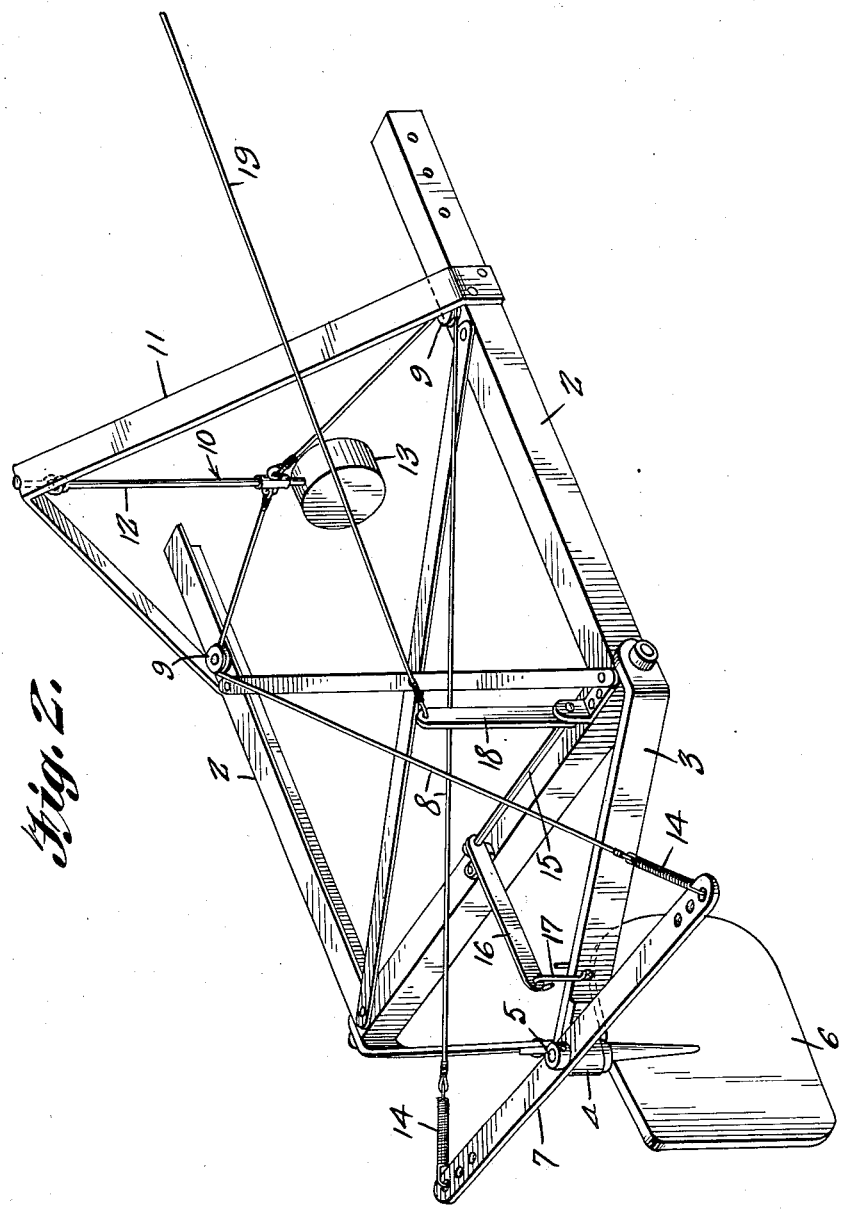
Albert Miller,
INVENTOR
BY Victor J. Evans & Co.
ATTORNEY Patented Nov. 6, 1934

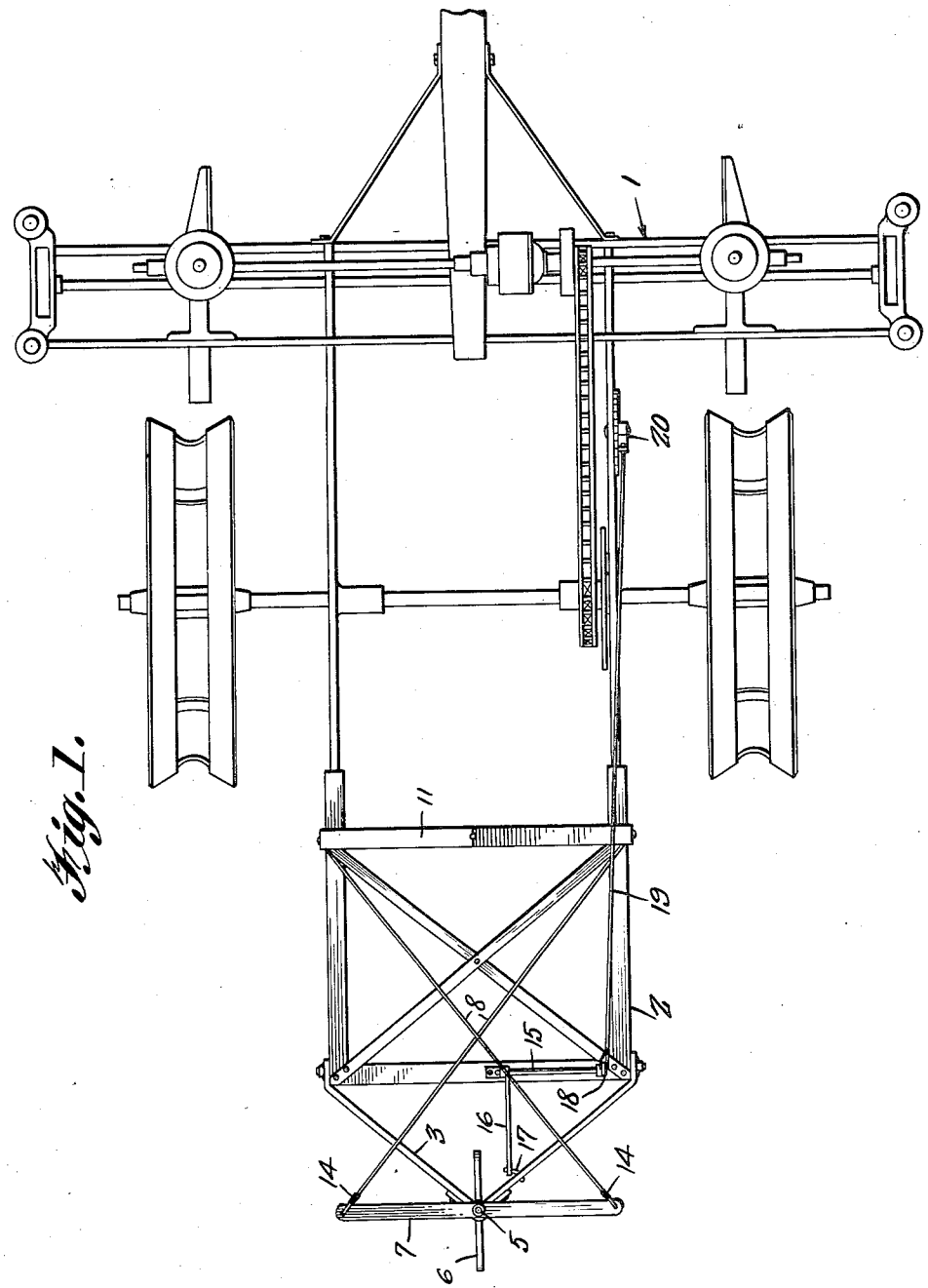

1,980,074

UNITED STATES PATENT OFFICE 1,980,074

CORN PLANTER ATTACHMENT

Albert Miller, Mondovi, Wis.

Application November 6, 1933, Serial No. 696,870

4 Claims. (Cl. 97—233)

This invention relates to attachments for corn planters and similar devices and has for the primary object the provision of a device of the above stated character which will counteract side slipping of a planter or similar device when operating on a hillside so that the planting will be maintained in a straight line.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating an attachment constructed in accordance with my invention and applied to a planter.

Figure 2 is a perspective view illustrating the attachment.

Referring in detail to the drawings, the numeral 1 indicates a planter of the conventional type which when operating on a hillside will have a tendency to side slip and cause planting in an irregular course and to overcome this objection my invention is applied to the rear portion of the planter, as shown in Figure 1 and will act as a rudder to prevent side slipping.

The attachment consists of an auxiliary frame 2 suitably secured to the rear portion of the main frame of the planter and has hinged to its rear end a V-shaped bracket 3 carrying at its apex a bearing 4 to rotatably receive a pintle 5 carried by a shoe 6. The shoe 6 contacts with the ground and acts as a rudder to the planter. A lever 7 is secured to the pintle 5 and has connected to its ends cables or other flexible elements 8 which intercross, as shown in Figure 2 and are trained over pulleys 9 carried by the auxiliary frame and have their forward ends connected to opposite sides of a pendulum 10. A V-shaped bracket 11 is carried by the forward portion of the auxiliary frame and extends upwardly from the latter and has pivotally connected to its apex the pendulum which is in the form of a rod 12 carrying at its lower end a weight 13. Coil springs 14 may be interposed in the cables 8 or between the latter and the ends of the arm 7.

In operation, when the planter is moving on a hillside, the pendulum maintains a perpendicular position and through the cables the shoe 6 is turned in a direction to steer the rear end of the planter upwardly on the hill when the natural tendency of the rear end of the planter is to slip down the hillside, consequently maintaining the travel of the planter in a straight line upon the hillside.

A shaft 15 is journaled to the rear end of the auxiliary frame and has secured thereto an arm 16 pivotally connected to the bracket 3, as shown at 17. The shaft 15 also has secured thereto a lever 18 to which a cable or other flexible element 19 is secured and the latter extends forwardly to the planter and is connected to an operating lever 20 whereby the shoe may be moved into and out of engagement with the ground by swinging the bracket 3 on its pivots.

While I have shown and described the preferred embodiment of my invention, it will be understood that minor changes in construction, combination and arrangement of parts may be made without departing from the spirit and scope of my invention, as claimed.

Having described the invention, I claim:

1. An attachment for a planter frame comprising an auxiliary frame adapted to be secured to the rear end thereof, a ground rudder carried by the auxiliary frame and a pendulum connected to said rudder and mounted to said auxiliary frame to swing laterally thereof for effecting operation of the rudder on a hillside.

2. An attachment for a planter frame comprising an auxiliary frame adapted to be secured to the rear end thereof, a ground rudder carried by the auxiliary frame, a bracket carried by the auxiliary frame, a pendulum connected to the auxiliary bracket for swinging movement laterally of the auxiliary frame, and means for connecting the pendulum to the rudder to effect operation of the latter on a hillside.

3. An attachment for a planter frame comprising an auxiliary frame adapted to be secured to the rear end thereof, a bracket pivoted to the auxiliary frame, a shoe journaled to the bracket for contact with the ground to act as a rudder, an arm secured to the shoe, a pendulum supported by the auxiliary frame having a lateral swinging movement relative to said auxiliary frame, and means for connecting the pendulum to the arm for effecting operation of the shoe on a hillside.

4. An attachment for a planter frame comprising an auxiliary frame adapted to be secured to the rear end thereof, a bracket pivoted to the auxiliary frame, a shoe journaled to the bracket for contact with the ground to act as a rudder, an arm secured to the shoe, a pendulum mounted to the auxiliary frame to have lateral swinging movement relative to the latter, means for connecting the pendulum to the arm to effect operation of the shoe on a hillside, and means for raising and lowering the bracket to engage and disengage the shoe with the ground.

ALBERT MILLER.